HENRY J. KOZICKI
*INVENTOR.*

BY John R. Faulkner
Thomas H. Oster
ATTORNEYS

Nov. 17, 1964  H. J. KOZICKI  3,157,242
MOTOR VEHICLE ROAD WHEEL SUSPENSION
Filed Dec. 30, 1960  3 Sheets-Sheet 2

HENRY J. KOZICKI
*INVENTOR.*

BY *John R. Faulkner*
*Thomas H. Oster*
ATTORNEYS

Nov. 17, 1964    H. J. KOZICKI    3,157,242
MOTOR VEHICLE ROAD WHEEL SUSPENSION
Filed Dec. 30, 1960    3 Sheets-Sheet 3

HENRY J. KOZICKI
*INVENTOR.*

BY John R. Faulkner
Thomas H. Oster
ATTORNEYS

United States Patent Office 3,157,242
Patented Nov. 17, 1964

3,157,242
MOTOR VEHICLE ROAD WHEEL SUSPENSION
Henry J. Kozicki, Livonia, Mich., assignor to Ford Motor Company, Dearborn, Mich., a corporation of Delaware
Filed Dec. 30, 1960, Ser. No. 79,810
7 Claims. (Cl. 180—73)

This invention relates generally to a motor vehicle wheel suspension and more particularly to a suspension system for the rear wheels. The present invention is particularly adapted to provide a motor vehicle suspension system with a low wheel rate and also to reduce the lateral movement of the sprung assembly of the motor vehicle relative to the unsprung assembly when the vehicle is being cornered.

The suspension system of this invention utilizes a pair of longitudinally extending cantilever springs, each having one end mounted to the frame of a motor vehicle and the other end pivotally connected to a shackle attached to the rear axle of the vehicle inboard from the rear wheels. Each shackle is adapted to pivot about a longitudinal axis. Swinging movement of the axle about its roll center results in the tilting of each shackle which in turn twists the longitudinally extending cantilever springs to furnish roll resistance when the vehicle is being cornered.

A torsion leaf spring, which has one end mounted to a side frame rail of the vehicle, extends transversely beyond the longitudinal axis of the vehicle. The differential carrier housing of the rear axle is connected to the transversely extending torsion leaf spring by a substantially triangular control arm. Two legs of the control arm extend forwardly and downwardly from its apex, the latter being attached to the differential carrier housing by a ball and socket connection. The end of one leg of the control arm is directly connected to the transversely extending leaf spring while both legs of the control arm are pivotally connected to a frame cross member intermediate the transversely extending leaf spring and the differential carrier housing.

An object of this invention is to provide a suspension system for the rear wheels which has inherent low wheel rates to provide soft riding qualities for the motor vehicle.

Another object of this invention is to provide a suspension system which assists in stabilizing the vehicle body when the vehicle is being cornered.

A further object of this invention is to reduce the vertical movement of the universal joint to permit the design of vehicles with lower seats and floors.

Other objects and advantages of this invention will become more apparent from the following description when viewed in connection with the accompanying drawings in which.

It is to be understood that the term "frame" as used in the specification and in the claims refers to either a vehicle frame construction or a unitary frame and body construction.

Figure 1:
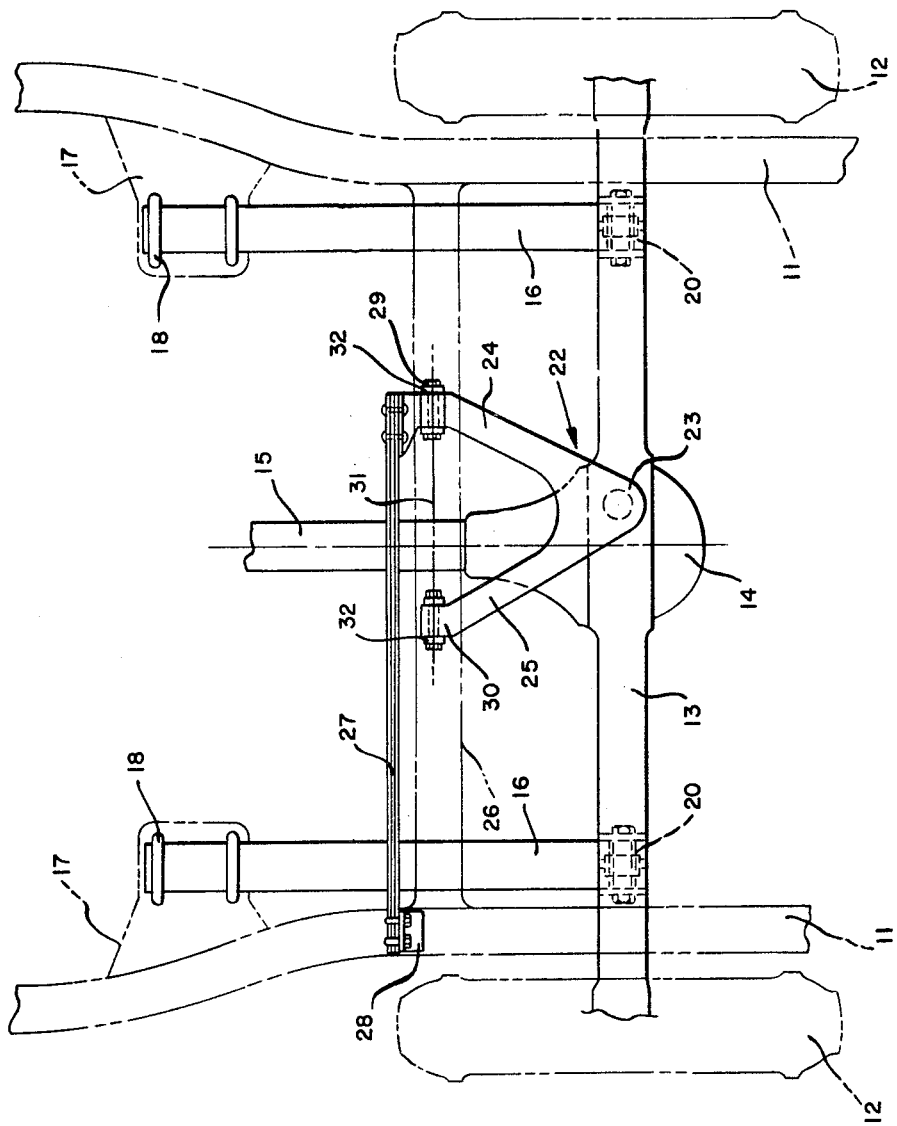
FIGURE 1 is a plan view of a portion of a motor vehicle chassis depicting the rear suspension members of this invention.
Figure 2:
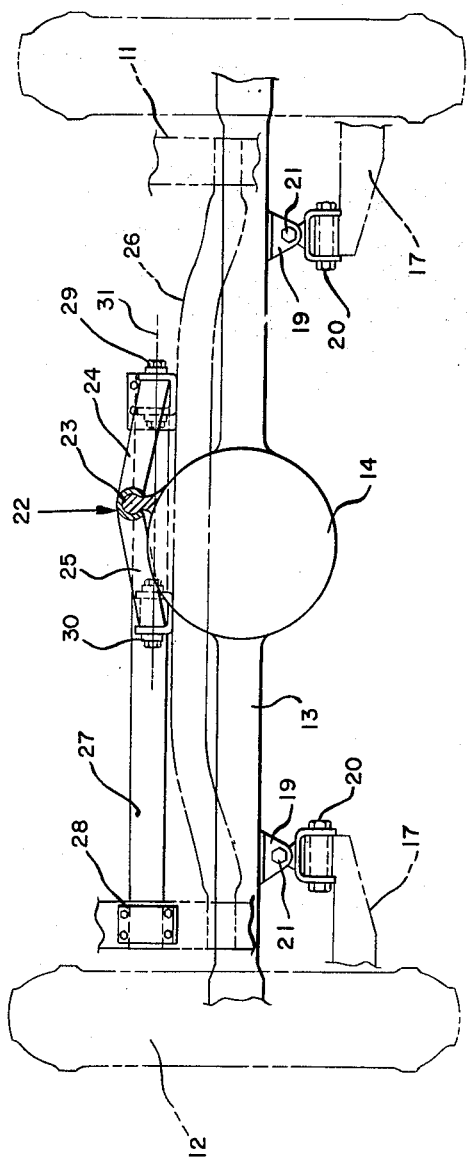
FIGURE 2 is a rear elevational view of the rear suspension member shown in FIGURE 1 with the ball and socket connection shown in section.
Figure 3:
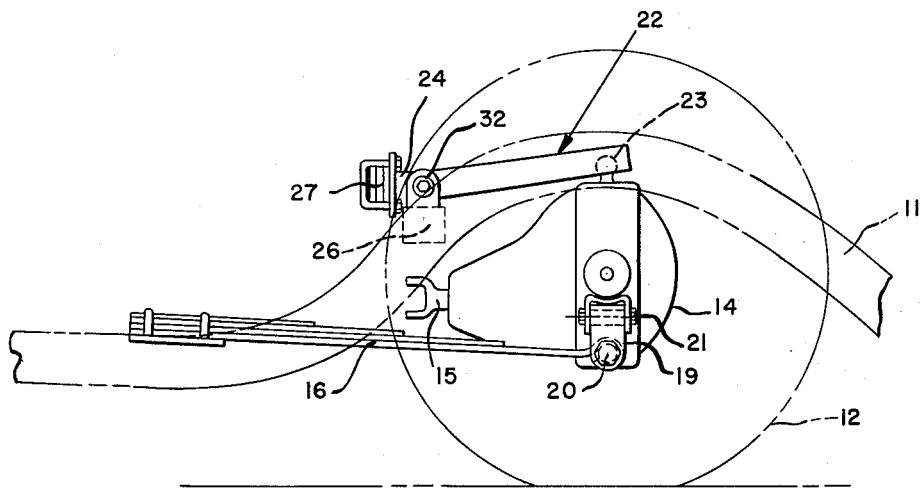
FIGURE 3 is a side elevational view of the rear suspension members shown in FIGURE 1.

In FIGURE 1 are seen side frame rails 11 of a motor vehicle frame. Rear road wheels 12 are disposed at opposite ends of a rear axle 13. A differential carrier housing 14 in the center of the rear axle 13 is connected to a drive shaft 15. A pair of generally longitudinally extending cantilever leaf springs 16 which have their main cross-sectional dimension disposed horizontally are attached to a frame bracket 17 by U-bolts 18. Each frame bracket 17 is secured to the inboard side of the side frame rail 11 forwardly from the rear axle 13. The rear cantilever end of each of the leaf springs 16 is pivotally connected to a shackle 19 by a pivotal connection 20 which extends transversely of the vehicle, best seen in FIGURES 2 and 3. A second connection 21, which is interposed between the shackle 19 and the rear axle 13, permits the pivotal movement of the shackle 19 about an axis parallel with the center longitudinal axis of the vehicle.

A substantially triangular control arm 22 has an apex which is attached to the top of the differential carrier housing 14 with a ball and socket connection 23 to allow for universal movement of the differential carrier housing. The ball and socket connection 23 acts as a roll center for the unsprung portion of the vehicle. Two legs 24 and 25 of the control arm 22 extend forwardly and downwardly from its apex to connect the differential carrier housing 14 with a cross-frame member 26 and a generally transversely extending torsion leaf spring 27.

The torsion leaf spring 27, which has its main cross-sectional dimension disposed vertically, has one end attached to a second frame bracket 28 secured to one of the side frame rails 11. As best seen in FIGURE 1, the torsion leaf spring 27 extends inboard beyond the vehicle's center longitudinal axis with its extended end attached to one leg 24 of the control arm 22. The intermediate portion of the generally longitudinal leg 24 is pivotally connected at 29 to the cross-frame member 26 which connects the pair of side frame rails 11 intermediate the transversely extending leaf spring 27 and the rear axle 13. The end of the second leg 25 of the control arm 22 is pivotally connected at 30 to the cross-frame member 26 with both pivotal connections 29 and 30 lying on a transverse axis 31 which is parallel to the axle of the vehicle. The pivotal connections 29 and 30 may be journaled in elastic bushings 32 to reduce the transmission of vibration from the rear road wheels 12 into the vehicle body.

The substantially triangular control arm 22 acts as an upper control arm for the rear suspension system of the motor vehicle. A portion of the rear end weight of the unsprung portion of the vehicle is carried by the transversely extending torsion leaf spring 27 through the control arm 22. The torsion leaf spring 27 acts as an auxiliary spring supplementing the cantilever springs 16 in jounce and rebound motion of the rear road wheels 12. The triangular control arm 22 together with the cantilever springs 16 control the path of the differential carrier housing 14 and reduce the vertical movement of the drive shaft 15 and the universal joint to permit a lower floor in the motor vehicle.

The cantilever springs 16 also act as the lower trailing arms of the suspension system of this invention during wheel movement. Utilization of a ball and socket connection 23 between the apex of the control arm 22 and the differential carrier housing 14 permits the swinging movement of the rear axle 13 about its roll center when the vehicle is being cornered.

With the axle 13 in roll, a mismatch occurs between the path of the pivotal connection 20 located between the shackle 19 and the leaf spring 16 which travels in a vertical direction and the path of the pivotal connection 21 located between the shackle 19 and the axle 13 which travels in an arc about the roll center. This results in the tilting of the shackle 19 which, in turn, will twist the longitudinal leaf spring 16 about its longitudinal axis. The twisting of the leaf spring 16 will furnish roll resistance to stabilize the vehicle body in roll.

I claim:

1. A motor vehicle having sprung components and unsprung components, said unsprung components including an axle, longitudinal leaf spring means interconnecting the outer ends of said axle with said sprung components, said longitudinal leaf spring means supporting a portion of the weight of said axle and resisting lateral movement of said sprung components with respect to said axle, a control arm, second spring means extending generally transversely of said vehicle and having transversely spaced portions thereof connected to said vehicle and said control arm respectively, a universal connection between said control arm and said axle adapted to allow for universal movement of said axle about said connection, a pivotal connection between said control arm and said vehicle longitudinally spaced from said universal connection and from said connection between said second spring means and said control arm, said second spring means supporting the remaining portion of said axle and torsionally resisting vertical movement of said axle with respect to the sprung components of the vehicle.

2. A motor vehicle having sprung components and unsprung components, said unsprung components including road wheels disposed at opposite ends of said axle, said sprung components including a vehicle frame, longitudinal spring members interconnecting said frame with the outer end portions of said axle adjacent said road wheels to maintain said road wheels in a lateral relationship with respect to said frame, said interconnection between said longitudinal spring members and said axle being constructed and arranged to restrain the lateral movement of the frame with respect to said axle during vehicle roll, a control arm, a torsion spring member extending generally transversely of said vehicle and having transversely spaced parts connected to said vehicle and said control arm respectively, a universal connection between said control arm and said axle adapted to allow for universal movement of said axle about said connection, a pivotal connection between said control arm and said vehicle longitudinally spaced from said universal connection and from said connection between said torsion spring member and said part of the control arm, said torsion spring member supporting the remaining portion of the weight of said axle and resisting the vertical movement of said axle with respect to said frame during jounce movement of said road wheels.

3. In a motor vehicle, a frame, an axle, a differential carrier housing disposed in the center of said axle, road wheels disposed at opposite ends of said axle, a shackle connected to said rear axle intermediate said differential carrier housing and one of said road wheels, said connection between the rear axle and the shackle being adapted to permit the pivotal movement of said shackle about an axis parallel to the longitudinal axis of said vehicle, cantilever lead springs extending generally longitudinally of said vehicle to connect said axle to said frame, one end of each of said cantilever leaf springs being rigidly secured to said frame, the other end of said each of the cantilever leaf springs being pivotally connected to said shackle, a torsion spring member extending generally transversely of said vehicle and having one end portion connected to said frame, and a control arm having one part universally connected to said differential carrier housing and another part connected to the other end portion of said torsion spring member, said control arm also being pivotally connected to said frame intermediate the connection of said control arm to said torsion spring member and said axle, said torsion spring member resisting the swinging movement of said axle about its universal connection.

4. In a motor vehicle, a frame, an axle, a differential carrier housing disposed in the center of the axle, rear road wheels disposed at opposite ends of said axle, a pair of shackles, each shackle connected to said axle for pivotal movement about an axis parallel to the longitudinal axis of said vehicle, a pair of longitudinally extending cantilever springs, each having one end mounted to said frame and its other end pivotally connected to one of said shackles, a generally longitudinally extending triangular control arm, a universal connection between the apex of said control arm and said differential carrier housing, said control arm having two legs extending forwardly and downwardly from its apex, a torsion spring member extending generally transversely of said vehicle and having one end portion secured to said frame, one end of one of said legs of the control arm being connected to the transversely extending other end portion of said torsion spring member, both of said legs of said control arm being pivotally conected to said frame intermediate said torsion spring member and said differential carrier housing.

5. The structure as described in claim 4 and which is further characterized in that the pivotal connections between said legs of said control arm and said frame are adapted to pivot said control arm about an axis parallel to the axle of said vehicle.

6. In a motor vehicle having a frame, a rigid axle, road wheels disposed at opposite ends of said axle, a pair of shackles connected to said axle for pivotal movement about an axis parallel to the longitudinal center line of said vehicle, a pair of cantilever leaf springs extending generally longitudinally of said vehicle, one end of each cantilever spring being secured to said frame and the other end of each cantilever spring being connected to one of said shackles for pivotal movement about a transversely extending axis, a triangular control arm having its apex universally connected to said axle intermediate said shackles, said control arm having leg portions pivotally connected to said frame on opposite sides of the longitudinal center line of the vehicle, a transversely extending torsion spring member having one end anchored at one side of the frame and the other end connected to the leg portion of the control arm on the side of the longitudinal center line of the vehicle opposite the anchor.

7. The structure as described in claim 6 and which is further characterized in that said universal connection between said control arm and said rigid axle is offset from the center longitudinal center line of said vehicle in a direction opposite from the anchor.

References Cited in the file of this patent

UNITED STATES PATENTS

| | | |
|---|---|---|
| 1,595,671 | Lipcot | Aug. 10, 1926 |
| 2,576,686 | Kolbe | Nov. 27, 1951 |
| 2,612,387 | Ronning | Sept. 30, 1952 |
| 2,695,791 | Heftler | Nov. 30, 1954 |
| 2,746,766 | Nallinger | May 22, 1956 |
| 2,893,750 | Allison | July 7, 1959 |
| 2,942,871 | Kraus | June 28, 1960 |

OTHER REFERENCES

Spring Design and Application, edited by Nicholas P. Chironis, 1961, McGraw-Hill Book Co., Inc.